(12) United States Patent
Yang et al.

(10) Patent No.: US 11,549,700 B2
(45) Date of Patent: Jan. 10, 2023

(54) WATER TANK AND HUMIDIFIER

(71) Applicant: Shenzhen Chenbei Technology Co., Ltd., Shenzhen (CN)

(72) Inventors: Lin Yang, Shenzhen (CN); Hai Yang, Shenzhen (CN)

(*) Notice: Subject to any disclaimer, the term of this patent is extended or adjusted under 35 U.S.C. 154(b) by 306 days.

(21) Appl. No.: 16/882,281

(22) Filed: May 22, 2020

(65) Prior Publication Data
US 2020/0370769 A1   Nov. 26, 2020

(30) Foreign Application Priority Data
May 22, 2019   (CN) .......................... 201920745606.6

(51) Int. Cl.
*F24F 6/14*     (2006.01)
*F24F 13/20*    (2006.01)
*F24F 6/00*     (2006.01)

(52) U.S. Cl.
CPC ................ *F24F 6/14* (2013.01); *F24F 13/20* (2013.01); *F24F 2006/008* (2013.01)

(58) Field of Classification Search
CPC ........ F24F 6/14; F24F 13/20; F24F 2006/008; B05B 17/0615; B05B 17/06; B05B 17/063; Y10S 261/48
See application file for complete search history.

(56) References Cited

U.S. PATENT DOCUMENTS

2013/0175362 A1* 7/2013 Lee .......................... F24F 6/14
239/302

FOREIGN PATENT DOCUMENTS

| CN | 201488171 U | * | 5/2010 | |
| CN | 106052056 A | * | 10/2016 | ............. F24F 13/00 |
| KR | 20010070690 A | * | 5/2001 | |

OTHER PUBLICATIONS

KR20010070690A Translation (Year: 2001).*
CN-106052056-A Translation (Year: 2016).*
CN-201488171-U Translation (Year: 2010).*

* cited by examiner

*Primary Examiner* — Schyler S Sanks
(74) *Attorney, Agent, or Firm* — Tsz Lung Yeung

(57) ABSTRACT

A water tank, comprising a bottom cover and a tank body that are assembled and that seal each other, wherein a mist discharging channel is disposed inside the tank body, a mist gathering assembly is disposed on the bottom cover, the mist outlet is connected to the mist discharging channel, a mounting cylinder used to mount the mist gathering assembly is further disposed on the bottom cover. The mist gathering assembly is detachably disposed on the bottom cover, to reduce a quantity of dead corners in the water tank, facilitate cleaning of the water tank, and further improve cleaning efficiency and cleanliness of the water tank. This effectively ensures water quality of misting of the humidifier. The mist gathering assembly is mounted by matching the protrusion, the clamping groove, and the elastic stopper, and is further characterized by advantages of reliable fastening and easy mounting.

18 Claims, 5 Drawing Sheets

US 11,549,700 B2

WATER TANK AND HUMIDIFIER

CROSS REFERENCE TO RELATED APPLICATION

This is a non-provisional application which claims priority to a Chinese application having an application number of CN 201920745606.6, and a filing date of May 22, 2019, the entire contents of this foreign application is hereby incorporated by reference.

BACKGROUND OF THE PRESENT INVENTION

Field of Invention

The present invention relates to the field of humidifier technologies, and in particular, to a water tank and a humidifier.

Description of Related Arts

With improvement of people's living standards, increasingly high requirements are imposed on indoor air comfort. Not only an indoor air temperature is required to be within a proper range, but also air humidity is required to be within a comfortable range. Therefore, various humidifiers emerge on the market, such as ultrasonic humidifiers, electrothermal humidifiers, and pure humidifiers. These humidifiers can control humidity of air, and have become essential for people's life.

Currently, a humidifier generally includes a water tank, a base, and a misting apparatus. An internal structure of the water tank is complex and has multiple parts, such as a mist gathering assembly. The mist gathering assembly is generally formed integrally with the water tank, and consequently there are a plurality of dead corners in the water tank, resulting in inconvenient and time-consuming cleaning. Long-time contact with water leads to a vulnerability to incrustation at the dead corners of the water tank, and the incrustation may pollute water in the water tank and affect water quality of misting.

SUMMARY OF THE PRESENT INVENTION

An objective of this application is to provide a water tank, so as to resolve a technical problem of inconvenient water tank cleaning in the prior art.

To achieve the foregoing objective, this application uses the following technical solution: a water tank includes a bottom cover and a tank body that are assembled and that seal each other, where a mist discharging channel is disposed inside the tank body, a mist gathering assembly is disposed on the bottom cover, the mist gathering assembly has a mist inlet and a mist outlet, the mist outlet is connected to the mist discharging channel, a mounting cylinder used to mount the mist gathering assembly is further disposed on the bottom cover, a clamping groove is disposed on a side wall of the mounting cylinder, a protrusion is disposed on an outer wall of the mist gathering assembly, the protrusion is clamped into the clamping groove for the mist gathering assembly to be detachably mounted inside the mounting cylinder, and the mounting cylinder is further provided with an elastic stopper used to restrict the protrusion from detaching from the clamping groove when the protrusion is not subject to an external force.

Preferably, the clamping groove includes an insertion groove and a stopper groove, one end of the insertion groove extends to an end face of the mounting cylinder, the other end of the insertion groove is connected to the stopper groove, the insertion groove and the stopper groove form an included angle, the protrusion is inserted into the insertion groove and rotated to enter the stopper groove, and the elastic stopper is used to limit the protrusion to inside the stopper groove.

Preferably, a movable groove connected to the stopper groove is further disposed on the mounting cylinder, the elastic stopper is an elastic arm and is disposed in the movable groove, one end of the elastic arm is disposed at a bottom of the movable groove, the other end of the elastic arm is a movable end, the movable end extends into the stopper groove and is capable of abutting against a side surface of the protrusion that is close to the insertion groove, and under an external force, the elastic arm is accommodated in the movable groove and separated from the protrusion.

Preferably, both the movable groove and the elastic arm are tilted relative to the stopper groove.

Preferably, an end face of the movable end is disposed as a first arc surface.

Preferably, the protrusion is flat, a width of the insertion groove is greater than a width of the protrusion, a height of the stopper groove is greater than a thickness of the protrusion, and a horizontal end face of the protrusion is disposed as a second arc surface.

Preferably, the stopper groove is an arc groove, and an end of the stopper groove that is away from the insertion groove is horizontal.

Preferably, the elastic arm is formed integrally with the mounting cylinder by using a plastic material.

Preferably, the protrusion is tilted relative to an axis of the mist gathering assembly, and a tilting direction of the protrusion faces the mist inlet.

Another objective of this application is to provide a humidifier, including a base a base housing having a receiving cavity; a water tank detachably supported by said base housing for storing a predetermined amount of water, said water tank comprising a bottom cover and a tank body that are assembled and that seal each other; wherein a mist discharging channel is disposed inside the tank body, a mist gathering assembly is disposed on the bottom cover, the mist gathering assembly has a mist inlet and a mist outlet, the mist outlet is connected to the mist discharging channel, a mounting cylinder used to mount the mist gathering assembly is further disposed on the bottom cover, a clamping groove is disposed on a side wall of the mounting cylinder, a protrusion is disposed on an outer wall of the mist gathering assembly, the protrusion is clamped into the clamping groove for the mist gathering assembly to be detachably mounted inside the mounting cylinder, and the mounting cylinder is further provided with an elastic stopper used to restrict the protrusion from detaching from the clamping groove when the protrusion is not subject to an external force; a vaporizer arrangement supported in said receiving cavity of said base housing for generating mist; and a fan supported in said base housing for creating air flow to drive the mist generated by the vaporizer arrangement to flow out through the mist collection assembly and the mist discharge channel.

This application has the following beneficial effects:

According to the water tank and the humidifier provided in this application, the mist gathering assembly is detachably disposed on the bottom cover, to reduce a quantity of dead corners in the water tank, facilitate cleaning of the water tank, and further improve cleaning efficiency and cleanliness of the water tank. This effectively ensures water quality of misting of the humidifier. The mist gathering assembly is mounted by matching the protrusion, the clamping groove, and the elastic stopper, and is further characterized by advantages of reliable fastening and easy mounting.

Figure 1:
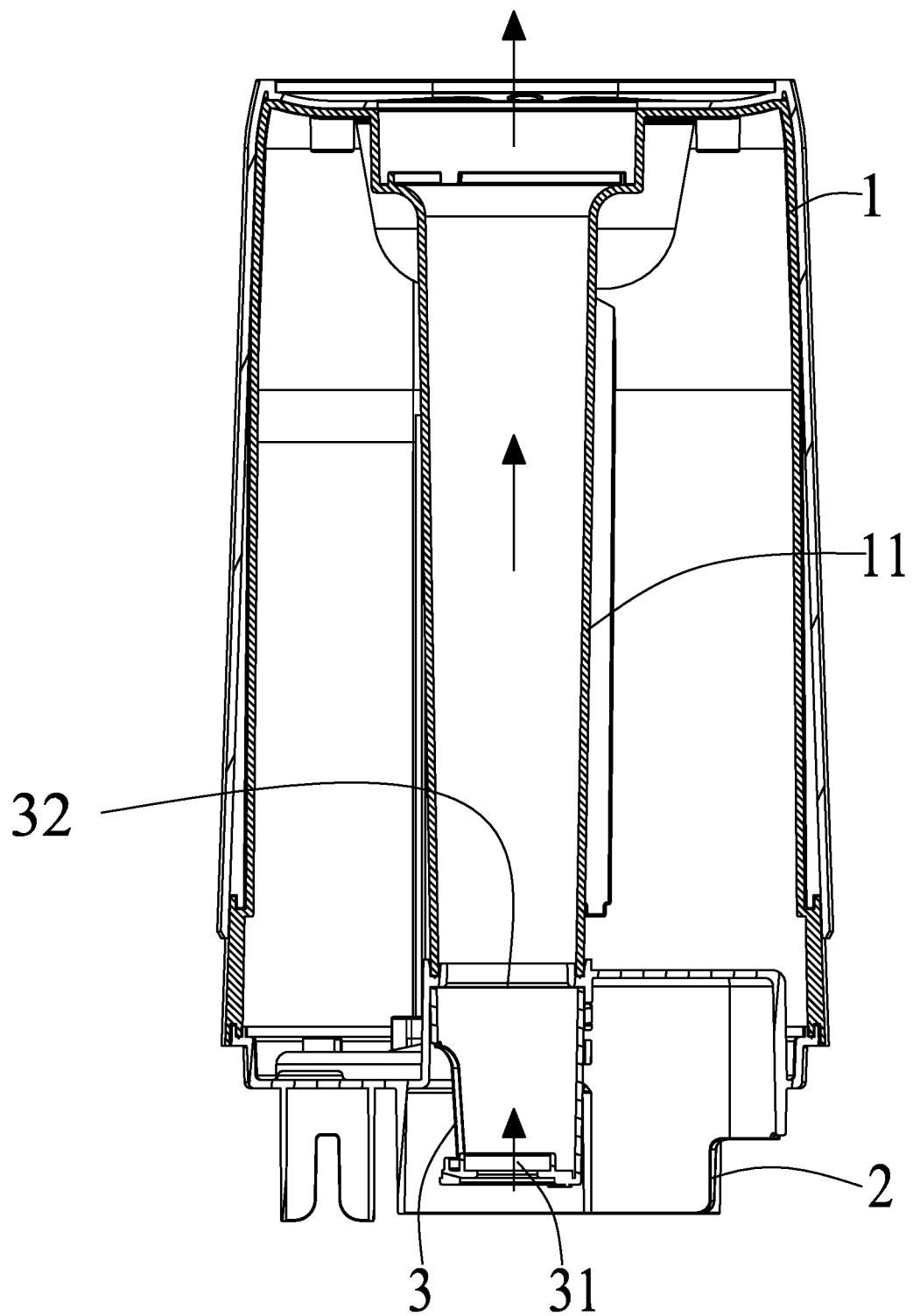
FIG. 1 is a sectional schematic structural diagram of a water tank according to an embodiment of this application.

Reference numerals: 1: tank body; 11: mist discharging channel; 2: bottom cover; 3: mist gathering assembly; 31: mist inlet; 32: mist outlet; 33: air inlet; 34: protrusion; 341: second arc surface; 4: mounting cylinder; 41: clamping groove; 411: insertion groove; 412: stopper groove; 42: elastic stopper; 421: movable groove; 422: elastic arm; 4221: movable end; 4222: first arc surface.

DETAILED DESCRIPTION OF THE PREFERRED EMBODIMENT

Embodiments of this application are described in detail below. Examples of the embodiments are illustrated in the accompanying drawings. Reference signs that keep the same or similar from beginning to end represent the same or similar elements or elements with same or similar functions. The embodiments described below with reference to the accompanying drawings are examples and merely intended for explaining this application, and should not be construed as a limitation on this application.

It should be understood that, in description of this application, directions or positional relationships indicated by terms "length", "width", "top", "bottom", "front", "rear", "left", "right", "vertical", "horizontal", "upper", "lower", "exterior", and "interior" and so forth are directions or positional relationships based on the accompanying drawings, which are just to describe this application easily and simplify the description, but do not indicate or imply that the referred apparatus or component must have a specific orientation and make construction and operations in the specific orientation, and cannot be construed as a limitation on this application.

In addition, the terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of this application, "a plurality of" means at least two, unless otherwise specifically limited.

In the description of this application, terms "mounting", "joint", and "connection" should be understood in a border sense unless otherwise explicitly stipulated and limited. For example, "connection" may be a fixed connection, a detachable connection, or an integrated connection; a mechanical connection or an electric connection; and a direct connection, a connection through an intermediate medium, or a connection inside two components or an interaction relationship between two components. For a person of ordinary skill in the art, specific meanings of the previous terms in this application can be understood based on a specific situation.

Figure 2:
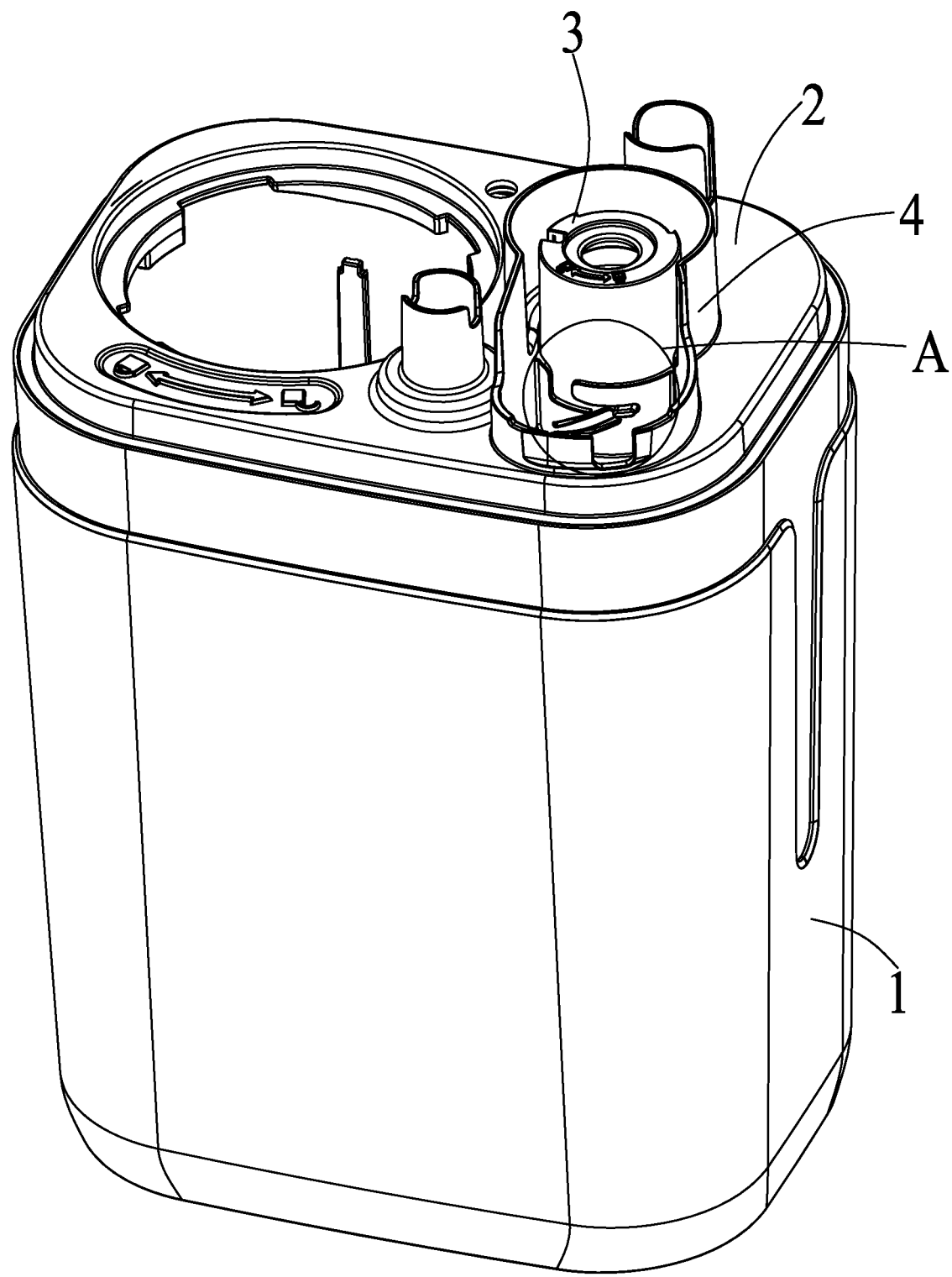
FIG. 2 is schematic diagram of a three-dimensional structure of an upside-down water tank according to an embodiment of this application.

As shown in FIG. 1 and FIG. 2, an embodiment of this application provides a water tank. In this embodiment, the water tank includes a bottom cover 2 and a tank body 1 that are assembled and that seal each other, where the bottom cover 2 is located at a bottom of the tank body 1, and the bottom cover 2 and the tank body 1 are detachably sealed and assembled. This ensures a water holding function of the water tank and facilitates cleaning of the water tank. For example, the bottom cover 2 and the tank body 1 are sealed and assembled through mutual insertion in combination with a sealing ring.

As shown in FIG. 1 and FIG. 2, a mist discharging channel 11 is disposed in the tank body 1, and the mist discharging channel 11 runs through the water tank. A mist gathering assembly 3 is disposed on the bottom cover 2, and the mist gathering assembly 3 is used to gather water mist (an arrow in the figure indicates a water mist flow direction). The mist gathering assembly 3 has a mist inlet 31 and a mist outlet 32. The mist inlet 31 and the mist outlet 32 are disposed on the same axis. The mist outlet 32 is connected to the mist discharging channel 11, and is used to guide the water mist to the mist discharging channel 11. The mist inlet 31 is disposed above a misting apparatus inside a base for the water mist to come in.

Figure 3:
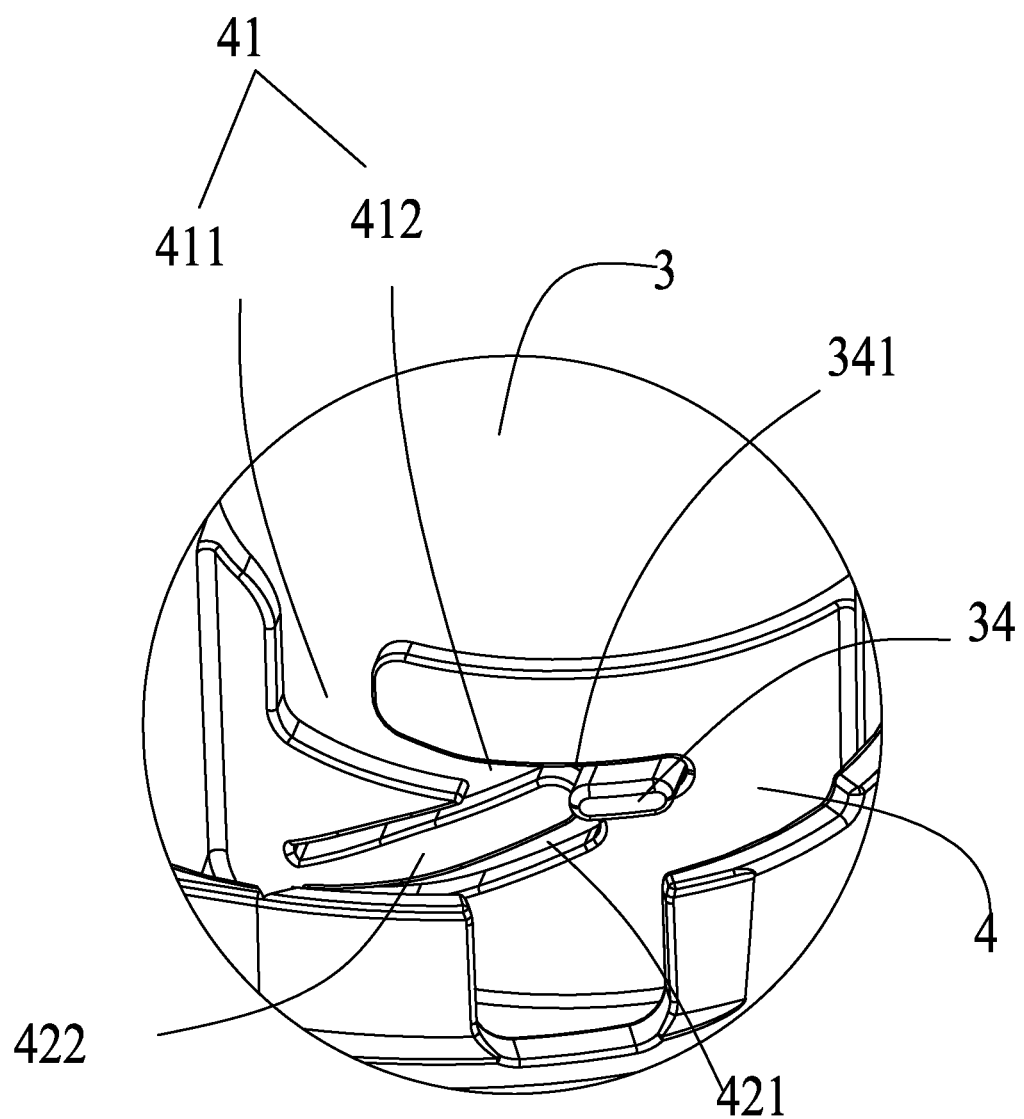
FIG. 3 is an enlarged view of A in FIG. 2.
Figure 4:
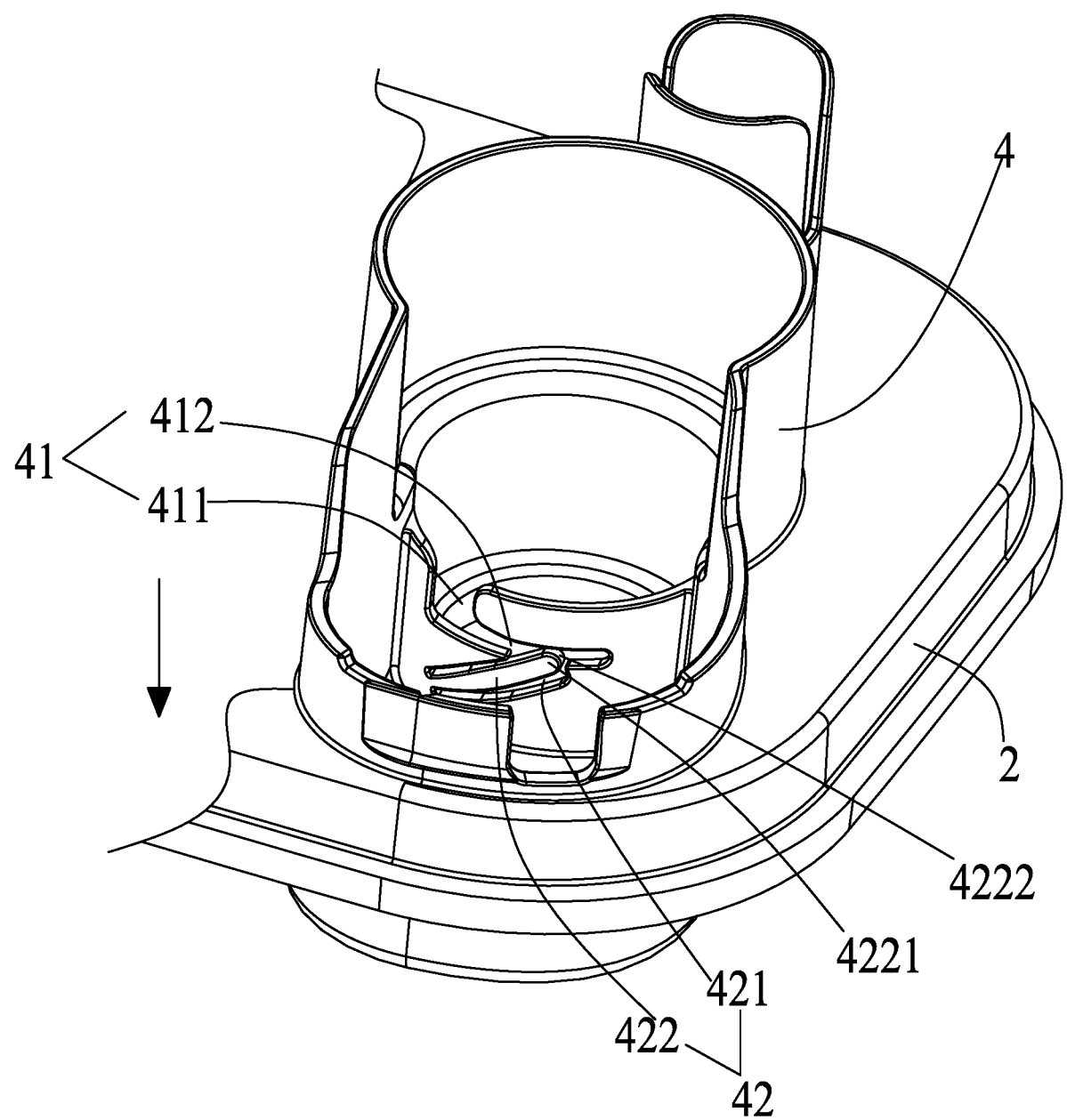
FIG. 4 is schematic diagram of a three-dimensional structure of a partial bottom cover and mounting cylinder according to an embodiment of this application.

As shown in FIG. 3 and FIG. 4, a mounting cylinder 4 used to mount the mist gathering assembly 3 is further disposed on the bottom cover 2, and the mounting cylinder 4 is connected to the mist discharging channel 11. The mist gathering assembly 3 is cylindrical. A clamping groove 41 is disposed on a side wall of the mounting cylinder 4. A protrusion 34 protruding outward radially is disposed on an outer wall of the mist gathering assembly 3, and the protrusion 34 is clamped into the clamping groove 41 for the mist gathering assembly 3 to be detachably mounted inside the mounting cylinder 4. The mounting cylinder 4 is further provided with an elastic stopper 42 used to restrict the protrusion 34 from detaching from the clamping groove 41 when the protrusion 34 is not subject to an external force.

As shown in FIG. 3 and FIG. 4, the elastic stopper 42 is used to restrict the protrusion 34 to inside the clamping groove 41, so that the mist gathering assembly 3 is stably mounted inside the mounting cylinder 4, and is advantageous in convenient mounting. When the mist gathering assembly 3 needs to be detached, an external force can be applied, so that the protrusion 34 deforms the elastic stopper 42 and the elastic stopper 42 is separated from the protrusion 34. In this way, the protrusion 34 is detached from the clamping groove 41 and the mist gathering assembly 3 has an advantage of convenient detachment.

According to the water tank provided in this application, the mist gathering assembly 3 is detachably disposed on the bottom cover 2, to reduce a quantity of dead corners in the water tank, facilitate cleaning of the water tank, and further improve cleaning efficiency and cleanliness of the water tank. This effectively ensures water quality of misting of the humidifier. The mist gathering assembly 3 is mounted by matching the protrusion 34, the clamping groove 41, and the elastic stopper 42, and is further characterized by advantages of reliable fastening and easy mounting.

Specifically, as shown in FIG. 3 and FIG. 4, the clamping groove 41 includes an insertion groove 411 and a stopper groove 412. One end of the insertion groove 411 extends to an end face of the mounting cylinder 4, and the other end of the insertion groove 411 is connected to the stopper groove 412. The insertion groove 411 and the stopper groove 412 form an included angle. The protrusion 34 is inserted into the insertion groove 411 and rotated to enter the stopper groove 412. The elastic stopper 42 is used to limit the protrusion 34 to inside the stopper groove 412. The insertion groove 411 is roughly vertically disposed (in a direction of an axis of the mounting cylinder 4). In this way, it is convenient to place the mist gathering assembly 3 inside. The stopper groove 412 and the insertion groove 411 form an included angle. When the protrusion 34 is screwed into the stopper groove 412, the mist gathering assembly 3 can be stably attached to the mounting cylinder 4.

More specifically, in this embodiment, the stopper groove 412 is an arc groove, and an end of the stopper groove 412 that is away from the insertion groove 411 (namely, a bottom of the stopper groove 412) is horizontal. The stopper groove 412 is an arc groove, so that the protrusion 34 can be conveniently screwed into the bottom of the stopper groove 412 and conveniently unscrewed. The horizontal bottom of the stopper groove 412 prevents the protrusion 34 from sliding under gravity of the mist gathering assembly 3.

Specifically, as shown in FIG. 3 and FIG. 4, in this embodiment, a movable groove 421 connected to the stopper groove 412 is further disposed on the mounting cylinder 4. The elastic stopper 42 is an elastic arm 422 and is disposed in the movable groove 421. One end of the elastic arm 422 is disposed at a bottom of the movable groove 421, and the other end of the elastic arm 422 is a movable end 4221. The movable end 4221 extends into the stopper groove 412 and abuts against a side surface of the protrusion 34 that is close to the insertion groove 411. Under an external force, the movable end 4221 of the elastic arm 422 is accommodated in the movable groove 421 and separated from the protrusion 34. A main function of the movable groove 421 is to provide space for elastic deformation of the elastic arm 422. Without an external force, the movable end 4221 of the elastic arm 422 is deep into the stopper groove 412 to prevent the protrusion 34 from being unscrewed from the stopper groove 412.

Specifically, in this embodiment, both the movable groove 421 and the elastic arm 422 are tilted relative to the stopper groove 412, so that the elastic arm 422 can perform elastic deformation conveniently. Specifically, an included angle between the movable end 4221 of the elastic arm 422 and the stopper groove 412 is 30° to 60°, and is preferably 45°. In other embodiments, the elastic arm 422 may be disposed vertically, and the elastic arm 422 extends to a junction of the insertion groove 411 and the stopper groove 412. Without an external force, the elastic arm 422 blocks the junction thereof, so that the protrusion 34 cannot be unscrewed from the stopper groove 412. During mounting, the elastic arm 422 first shifts towards a direction away from the stopper groove 412 under an external force.

Specifically, as shown in FIG. 3 and FIG. 4, an end face of the movable end 4221 of the elastic arm 422 is disposed as a first arc surface 4222. When the protrusion 34 is under an external force, the first arc surface 4222 enables the protrusion 34 to conveniently deform the elastic arm 422 downwardly (an arrow in FIG. 4 indicates the downward direction) and be accommodated in the movable groove 421, so that the protrusion 34 can be conveniently unscrewed from the stopper groove 412. During mounting, the protrusion 34 downwardly squeezes the elastic arm 422 into the movable groove 421, and is then screwed into the bottom of the stopper groove 412. Subsequently, the elastic arm 422 automatically bounces back and enables the movable end 4221 to abut against the side surface of the protrusion 34, thereby limiting the protrusion 34 and implementing an advantage of easy mounting.

Specifically, as shown in FIG. 3 and FIG. 4, in this embodiment, the protrusion 34 is flat, and a width of the insertion groove 411 is greater than a width of the protrusion 34, thereby facilitating insertion of the protrusion 34. A height of the stopper groove 412 is greater than a thickness of the protrusion 34, so that the protrusion 34 can be conveniently screwed into the stopper groove 412. A horizontal end face of the protrusion 34 is disposed as a second arc surface 341. The second arc surface 341 can reduce resistance between the protrusion 34 and the elastic arm 422, and the protrusion 34 can be conveniently unscrewed under an external force. In other embodiments, the protrusion 34 may also be disposed in a cylindrical shape.

Specifically, in this embodiment, the elastic arm 422 and the mounting cylinder 4 are integrally formed by using a plastic material. In this way, elastic strength of the elastic arm 422 is effectively ensured. More specifically, the bottom cover 2, the mounting cylinder 4, and the elastic arm 422 are integrally formed.

Figure 5:
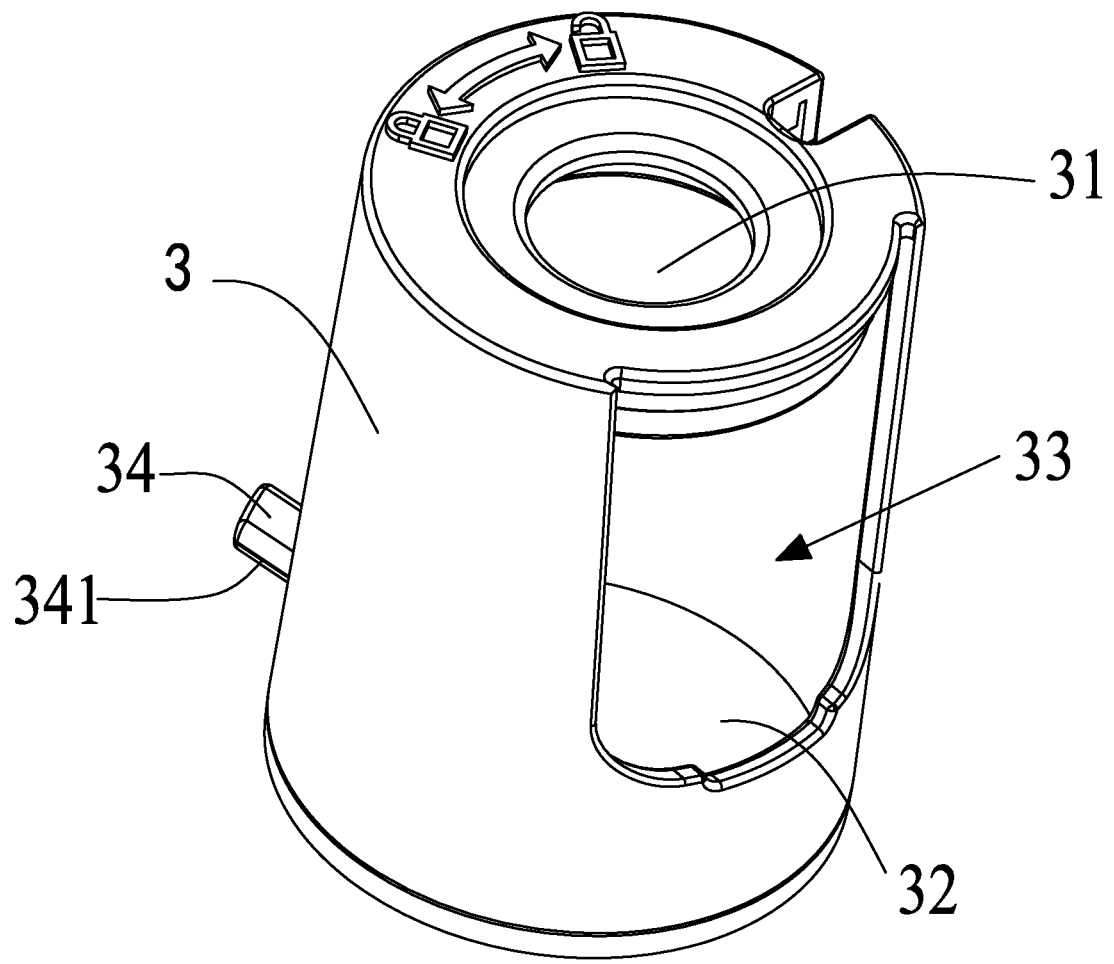
FIG. 5 is schematic diagram of a three-dimensional structure of a mist gathering assembly according to an embodiment of this application.

As shown in FIG. 5, in this embodiment, the protrusion 34 is tilted relative to an axis of the mist gathering assembly 3, and a tilting direction of the protrusion 34 faces the mist inlet 31. With the protrusion 34 tilted, a deformation resistance capability of the protrusion 34 is improved, and the protrusion 34 can stably attach the mist gathering assembly 3 to the mounting cylinder 4. Specifically, an air inlet 33 is further disposed on a side wall of the mist gathering assembly 3 to change a wind direction inside the mist gathering assembly 3, so as to reduce a wind speed and effectively reduce noise generated due to the wind speed.

According to the water tank provided in the embodiments of this application, the mist gathering assembly 3 is detachable, and there is no need to add another fastening structure to implement detachability of the mist gathering assembly 3, bringing advantages of low costs and high material utilization. In addition, the mist gathering assembly 3 can be mounted and detached through rotation, and is advantageous in simple and reliable fastening and high assembly efficiency.

Referring to FIG. 1, an embodiment of this application further provides a humidifier. The humidifier includes a base (not shown in the figure) and a water tank. The water tank is disposed on the base. The water tank is configured to hold water and discharge water mist. Further, a misting apparatus is disposed inside the base of the humidifier, and is configured to turn water into water mist. A fan is further disposed inside the base to provide wind, so as to discharge the water mist. A structure of the water tank is described above and no details are repeated herein.

The foregoing descriptions are merely examples of the embodiments of this application, and are not intended to limit this application. Any modification, equivalent replacement, or improvement made without departing from the spirit and principle of this application should fall within the protection scope of this application.

What is claimed is:
1. A water tank, comprising a bottom cover and a tank body that are assembled and that seal each other, wherein a mist discharging channel is disposed inside the tank body, a mist gathering assembly is disposed on the bottom cover, the mist gathering assembly has a mist inlet and a mist outlet, the mist outlet is connected to the mist discharging channel, a mounting cylinder used to mount the mist gathering assembly is further disposed on the bottom cover, a clamping groove is disposed on a side wall of the mounting cylinder, a protrusion is disposed on an outer wall of the mist gathering assembly, the protrusion is clamped into the clamping groove for the mist gathering assembly to be detachably mounted inside the mounting cylinder, and the mounting cylinder is further provided with an elastic stopper used to restrict the protrusion from detaching from the clamping groove when the protrusion is not subject to an external force.

2. The water tank, as recited in claim 1, wherein the clamping groove comprises an insertion groove and a stopper groove, one end of the insertion groove extends to an end face of the mounting cylinder, the other end of the insertion groove is connected to the stopper groove, the insertion groove and the stopper groove form an included angle, the protrusion is inserted into the insertion groove and rotated to enter the stopper groove, and the elastic stopper is used to limit the protrusion to inside the stopper groove.

3. The water tank, as recited in claim 2, wherein a movable groove connected to the stopper groove is further disposed on the mounting cylinder, the elastic stopper is an elastic arm and is disposed in the movable groove, one end of the elastic arm is disposed at a bottom of the movable groove, the other end of the elastic arm is a movable end, the movable end extends into the stopper groove and is capable of abutting against a side surface of the protrusion that is close to the insertion groove, and the elastic arm is accommodated in the movable groove and separated from the protrusion when the elastic arm is under the external force.

4. The water tank, as recited in claim 3, wherein both the movable groove and the elastic arm are tilted relative to the stopper groove when the elastic arm is under the external force.

5. The water tank, as recited in claim 4, wherein an end face of the movable end is configured as a first arc surface.

6. The water tank, as recited in claim 5, wherein the protrusion is flat, a width of the insertion groove is greater than a width of the protrusion, a height of the stopper groove is greater than a thickness of the protrusion, and a horizontal end face of the protrusion is configured as a second arc surface.

7. The water tank, as recited in claim 6, wherein the stopper groove is an arc groove, and an end of the stopper groove that is away from the insertion groove is horizontal.

8. The water tank, as recited in claim 7, wherein the elastic arm is formed integrally with the mounting cylinder by using a plastic material.

9. The water tank, as recited in claim 8, wherein the protrusion is tilted relative to an axis of the mist gathering assembly.

10. A humidifier, comprising:
a base housing having a receiving cavity;
a water tank detachably supported by said base housing for storing a predetermined amount of water, said water tank comprising a bottom cover and a tank body that are assembled and that seal each other;
wherein a mist discharging channel is disposed inside the tank body, a mist gathering assembly is disposed on the bottom cover, the mist gathering assembly has a mist inlet and a mist outlet, the mist outlet is connected to the mist discharging channel, a mounting cylinder used to mount the mist gathering assembly is further disposed on the bottom cover, a clamping groove is disposed on a side wall of the mounting cylinder, a protrusion is disposed on an outer wall of the mist gathering assembly, the protrusion is clamped into the clamping groove for the mist gathering assembly to be detachably mounted inside the mounting cylinder, and the mounting cylinder is further provided with an elastic stopper used to restrict the protrusion from detaching from the clamping groove when the protrusion is not subject to an external force;
a vaporizer arrangement supported in said receiving cavity of said base housing for generating mist; and
a fan supported in said base housing for creating air flow to drive the mist generated by the vaporizer arrangement to flow out through the mist collection assembly and the mist discharge channel.

11. The humidifier, as recited in claim 10, wherein the clamping groove comprises an insertion groove and a stopper groove, one end of the insertion groove extends to an end face of the mounting cylinder, the other end of the insertion groove is connected to the stopper groove, the insertion groove and the stopper groove form an included angle, the protrusion is inserted into the insertion groove and rotated to enter the stopper groove, and the elastic stopper is used to limit the protrusion to inside the stopper groove.

12. The humidifier, as recited in claim 11, wherein a movable groove connected to the stopper groove is further disposed on the mounting cylinder, the elastic stopper is an elastic arm and is disposed in the movable groove, one end of the elastic arm is disposed at a bottom of the movable groove, the other end of the elastic arm is a movable end, the movable end extends into the stopper groove and is capable of abutting against a side surface of the protrusion that is close to the insertion groove, and the elastic arm is accommodated in the movable groove and separated from the protrusion when the elastic arm is under the external force.

13. The humidifier, as recited in claim 12, wherein both the movable groove and the elastic arm are tilted relative to the stopper groove when the elastic arm is under the external force.

14. The humidifier, as recited in claim 13, wherein an end face of the movable end is configured as a first arc surface.

15. The humidifier, as recited in claim 14, wherein the protrusion is flat, a width of the insertion groove is greater than a width of the protrusion, a height of the stopper groove is greater than a thickness of the protrusion, and a horizontal end face of the protrusion is configured as a second arc surface.

16. The humidifier, as recited in claim 15, wherein the stopper groove is an arc groove, and an end of the stopper groove that is away from the insertion groove is horizontal.

17. The humidifier, as recited in claim 16, wherein the elastic arm is formed integrally with the mounting cylinder by using a plastic material.

18. The humidifier, as recited in claim 17, wherein the protrusion is tilted relative to an axis of the mist gathering assembly.

* * * * *